Oct. 2, 1956
H. E. KLEIN
2,764,834
ARTIFICIAL BAIT FOR FISH
Filed Aug. 27, 1954
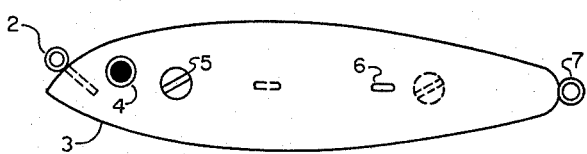
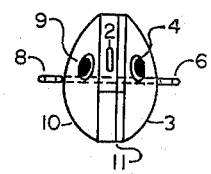
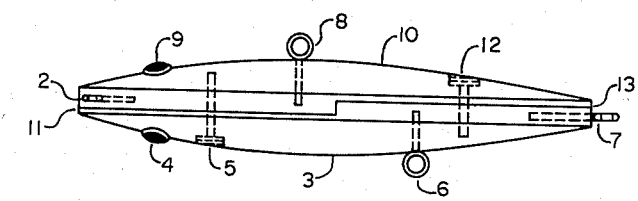
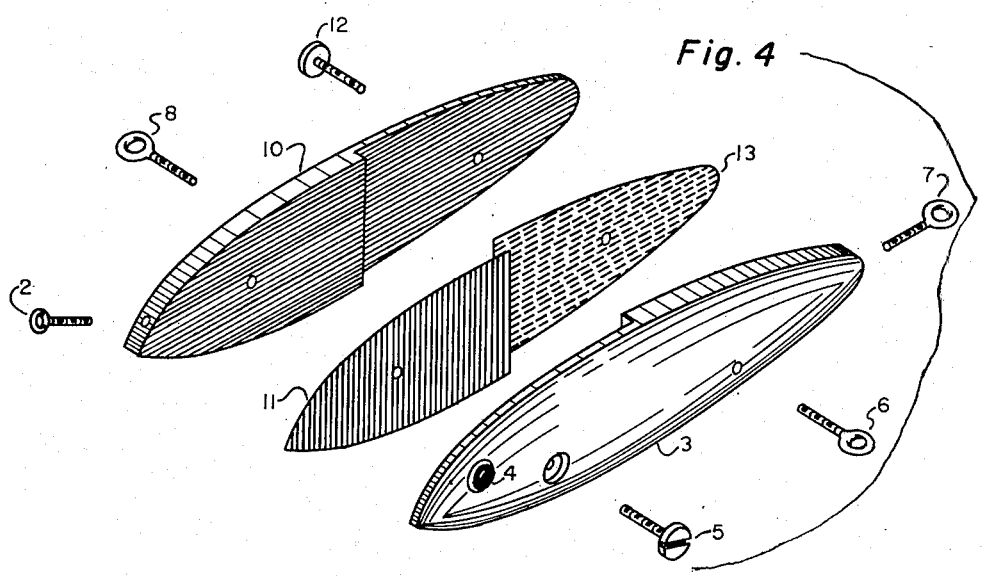
INVENTOR.
Harry E. Klein
BY John H. Ruckman
Attorney

United States Patent Office 2,764,834
Patented Oct. 2, 1956

2,764,834

ARTIFICIAL BAIT FOR FISH

Harry E. Klein, New Orleans, La.

Application August 27, 1954, Serial No. 452,645

1 Claim. (Cl. 43—42.09)

My invention relates to artificial bait for fish.

An object of this invention broadly considered is to provide a transparent body portion for the bait in which a fisherman may place inserts of any color which he may desire to use.

An object more specifically stated is to provide a device of this character having two separate transparent interlocking parts adapted to be joined longitudinally and having between them thin interchangeable inserts of any desired color.

The said objects I have accomplished by the means now to be described in detail and claimed, it being understood that changes in the precise embodiment of invention herein disclosed can be made within the scope of what is claimed without departing from the spirit of the invention.

The novel features which I believe to be characteristic of this invention are set forth with particularity in the appended claim. The invention itself, however, both as to organization and operation, together with additional objects and advantages thereof, will be best understood from the following description of a specific embodiment when read in connection with the accompanying drawing in which, Fig. 1 is a side elevational view of the assembled bait.
Fig. 2 is a front elevational view.
Fig. 3 is a top view.
Fig. 4 is an exploded view.

Referring to the construction shown in the drawing, the numeral 2 designates a screw eye at the front of the bait for attachment of a fish line. The bait has a left side body member 3, the rear portion of which is offset and thicker than the front portion as shown in Fig. 4. The numeral 4 designates a left eye which is preferably made of glass. 5 designates a screw adapted to be screwed through the body member. A screw eye 6 is adapted to be screwed into the side of the body member 3 for a hook attachment. A screw eye 7 is adapted to be screwed into the rear end of the member 3 for a hook attachment. A screw eye 8 is adapted to be screwed into the right side for a hook attachment. The numeral 9 designates an eye for the right body member 10 which is offset reversely from the body member 3. Inserts 11 and 13 of different color are adapted to be placed between the body members 3 and 10 when they are separated from each other as shown in Fig. 4. The screws are of non-corrosive material. The inserts 11 and 13 preferably consist of reflecting metalized vinyl sheeting of any desired color. A screw 12 in conjunction with the screw 5 but inserted from the opposite side of the bait serves to hold the members of the bait together. On account of the members of the bait being detachably held together, a fisherman is able to use inserts of any color he chooses.

I claim:

Artificial bait for fish comprising two transparent body members, the rear portion of one of the body members being offset internally and thicker than the front portion thereof, the front portion of the other body member being offset internally and thicker than the rear portion thereof so that the two body members interfit in reverse order, a thin insert of one color between the front portions of the body member, a thin insert of another color between the rear portions of the body member, and means for releasably securing said body members together whereby inserts of any desired colors may be used.

References Cited in the file of this patent

UNITED STATES PATENTS

| | | |
|---|---|---|
| 1,321,850 | Rhodes | Nov. 18, 1919 |
| 2,006,604 | Posts | July 2, 1935 |
| 2,149,464 | Potts | Mar. 7, 1939 |
| 2,241,851 | Gilstraps | May 13, 1941 |
| 2,353,995 | Conner | July 18, 1944 |
| 2,594,673 | Nichols | Apr. 29, 1952 |
| 2,618,096 | Wagner | Nov. 18, 1952 |
| 2,670,559 | Webb et al. | Mar. 2, 1954 |
| 2,706,867 | Ayres | Apr. 26, 1955 |

FOREIGN PATENTS

| | | |
|---|---|---|
| 810,552 | Germany | Aug. 13, 1951 |